US012643062B2

(12) United States Patent (10) Patent No.: US 12,643,062 B2
Meyer et al. (45) Date of Patent: Jun. 2, 2026

(54) FLUID FILTRATION SYSTEM WITH SINGLE USE FILTER AND INTEGRATED INTEGRITY TEST DEVICE AND METHOD OF USING SAME

(71) Applicant: Cytiva US LLC, Marlborough, MA (US)

(72) Inventors: Bernhard Anton Meyer, Dreieich (DE); Jens Bretschneider, Dreieich (DE)

(73) Assignee: Cytiva US LLC, Marlborough, MA (US)

( * ) Notice: Subject to any disclaimer, the term of this patent is extended or adjusted under 35 U.S.C. 154(b) by 555 days.

(21) Appl. No.: 17/937,690

(22) Filed: Oct. 3, 2022

(65) Prior Publication Data

US 2023/0211263 A1 Jul. 6, 2023

Related U.S. Application Data

(60) Provisional application No. 63/295,830, filed on Dec. 31, 2021.

(51) Int. Cl.
*B01D 35/14* (2006.01)
*B01D 29/60* (2006.01)
(Continued)

(52) U.S. Cl.
CPC ......... *B01D 35/143* (2013.01); *B01D 29/606* (2013.01); *B01D 29/902* (2013.01); *B01D 35/1573* (2013.01); *B01D 2201/54* (2013.01)

(58) Field of Classification Search
CPC .. B01D 35/143; B01D 29/606; B01D 29/902; B01D 35/1573; B01D 2201/54;
(Continued)

(56) References Cited

U.S. PATENT DOCUMENTS 4,340,479 A 7/1982 Pall
4,925,572 A 5/1990 Pall
(Continued)

FOREIGN PATENT DOCUMENTS

CN 108120560 A 6/2018
CN 111356520 A 6/2020
(Continued)

OTHER PUBLICATIONS

European Patent Office, Extended European Search Report in European Patent Application No. 22216935.1 (May 8, 2023).
(Continued)

*Primary Examiner* — Waqaas Ali

(74) *Attorney, Agent, or Firm* — Taft Stettinius & Hollister LLP

(57) ABSTRACT

A fluid filtration system includes a single use filter removably mounted to a cabinet of a workstation. The upstream end of the single use filter is in fluid communication with a pump via a fluid supply conduit that includes a test junction. An integrity test device is supported by the cabinet and is in fluid communication with the upstream end of the single use filter via a test conduit fluidly connected to the single use filter via the test junction of the fluid supply conduit. The integrity test device adapted to be connected to a source of pressurized gas and to selectively direct a flow of pressurized gas through the test conduit and the single use filter to perform a test operation on the single use filter.

10 Claims, 12 Drawing Sheets

(51) Int. Cl.

| | |
|---|---|
| B01D 29/90 | (2006.01) |
| B01D 35/143 | (2006.01) |
| B01D 35/157 | (2006.01) |

(58) Field of Classification Search

CPC ........... B01D 2311/04; B01D 2311/06; B01D 2311/14; B01D 2311/16; B01D 2313/16; B01D 2313/18; B01D 2313/58; B01D 2313/62; B01D 2313/70; B01D 2313/901; B01D 2313/903; B01D 65/102; B01D 61/22; B01D 29/35; B01D 24/10; B01D 29/50; B01D 35/14; B01D 61/00; B01D 63/00; B01D 65/10; B01D 27/00; B01D 2313/60; G01M 99/005

See application file for complete search history.

(56) References Cited

U.S. PATENT DOCUMENTS

| | | | |
|---|---|---|---|
| 5,152,905 | A | 10/1992 | Pall et al. |
| 5,443,743 | A | 8/1995 | Gsell |
| 5,472,621 | A | 12/1995 | Matkovich et al. |
| 6,074,869 | A | 6/2000 | Pall et al. |
| 8,354,029 | B2 * | 1/2013 | Hank ..................... B01D 61/12 |
| | | | 210/741 |
| 2011/0138936 | A1 | 6/2011 | Collins et al. |
| 2017/0284584 | A1 | 10/2017 | Kesselaar et al. |
| 2020/0353414 | A1 * | 11/2020 | Diel ....................... B01D 61/18 |

FOREIGN PATENT DOCUMENTS

| | | |
|---|---|---|
| EP | 2260919 A2 | 12/2010 |
| JP | H10-225628 A | 8/1998 |
| JP | 2007-283297 A | 11/2007 |
| JP | 2013-513470 A | 4/2013 |
| KR | 10-2013-0051693 A | 5/2013 |
| KR | 10-2019-0011338 A | 2/2019 |

OTHER PUBLICATIONS

Japan Patent Office, Notice of Reasons for Rejection in Japanese Patent Application No. 2022-209790 (Jan. 30, 2024).

China National Intellectual Property Administration, First Office Action, regarding Chinese Patent Application No. 202211722521.9, dated Apr. 22, 2025.

Korean Intellectual Property Office, Notice of Preliminary Rejection, regarding Korean Patent Application No. 10-2022-0190856, dated Jul. 30, 2025.

* cited by examiner

FLUID FILTRATION SYSTEM WITH SINGLE USE FILTER AND INTEGRATED INTEGRITY TEST DEVICE AND METHOD OF USING SAME

CROSS-REFERENCE TO RELATED APPLICATIONS

This patent application claims the benefit of priority to U.S. Provisional Patent Application No. 63/295,830, filed Dec. 31, 2021, and entitled, "Fluid Filtration System with Single Use Filter and Integrated Integrity Test Device and Method of Using Same," which is incorporated in its entirety herein by this reference.

BACKGROUND OF THE INVENTION

The use of a single-use system (SUS) is becoming more widespread for biopharmaceutical applications. An SUS can be used in systems such as, bioreactors and mixing systems. Exemplary upstream SUS applications include media preparation processes such as mixing and filtration, including tangential flow filtration (TFF), for example. Examples of downstream SUS applications include chromatography concentration and diafiltration and buffer preparation, for example.

An aspect of biopharmaceutical processing involves managing the movement of liquid through a myriad of elements including tubing, valves, filters, and sensors. The adoption of an SUS can offer several advantages over conventional reusable stainless steel systems. Single-use technology can increase process flexibility and reduce cross contamination risks; reduce or even eliminate the need for cleaning; reduce requirements for in-house sterilization, such as by autoclaving, and cleaning chemical inventory; and lower process downtime.

A filter integrity test ("FIT") is frequently required in many applications to ensure filtration performance. In conventional systems, FIT processes are frequently conducted manually and ex-situ. The manual, ex-situ FIT techniques can lead to misuse, insufficient testing, product loss, and wasted time.

There is a continued need in the art for single use applications related to the filtration of fluid. For example, there is a continued need in the art to provide additional solutions for filtering fluid in a sterile manner under conditions which can be verified to meet a predetermined FIT.

It will be appreciated that this background description has been created to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

BRIEF SUMMARY OF THE INVENTION

The present disclosure, in one aspect, is directed to embodiments of a fluid filtration system. In one embodiment, a fluid filtration system includes a workstation, a pump, a single use filter, a fluid supply conduit, an integrity test device, a test conduit, and a control unit.

The workstation includes a cabinet. The pump is supported by the cabinet and is adapted to selectively produce a flow of fluid. The single use filter has an upstream end and a downstream end. The single use filter is removably mounted to the workstation. The upstream end of the single use filter is in fluid communication with the pump via the fluid supply conduit. The fluid supply conduit includes a test junction.

The integrity test device is supported by the cabinet and is in fluid communication with the upstream end of the single use filter via the test conduit. The test conduit is fluidly connected to the single use filter via the test junction of the fluid supply conduit. The integrity test device is adapted to be connected to a source of pressurized gas and to selectively direct a flow of pressurized gas through the test conduit and the single use filter.

The control unit includes a processor and a non-transitory computer readable medium bearing an integrity test program. The processor is arranged with the computer readable medium to execute the integrity test program. The processor is in electrical communication with the integrity test device to selectively operate the integrity test device to perform a test operation on the single use filter using the flow of pressurized gas based upon instructions from the integrity test program.

In another aspect, the present disclosure is directed to embodiments of techniques for in-situ integrity testing of a single use filter. In one embodiment, a method of conducting in-situ integrity testing of a single use filter includes removably mounting a single use filter to a workstation. The workstation includes a cabinet. An upstream end of the single use filter is fluidly connected to a pump via a fluid supply conduit and to an integrity test device via a test conduit. The pump and the integrity test device are supported by the cabinet. The integrity test device is fluidly connected to a source of pressurized gas. The integrity test device is operated to direct a flow of pressurized gas through the test conduit to perform a test operation on the single use filter.

Further and alternative aspects and features of the disclosed principles will be appreciated from the following detailed description and the accompanying drawings. As will be appreciated, the fluid filtration systems and the methods of conducting in-situ integrity testing of a single use filter disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

Figure 1:
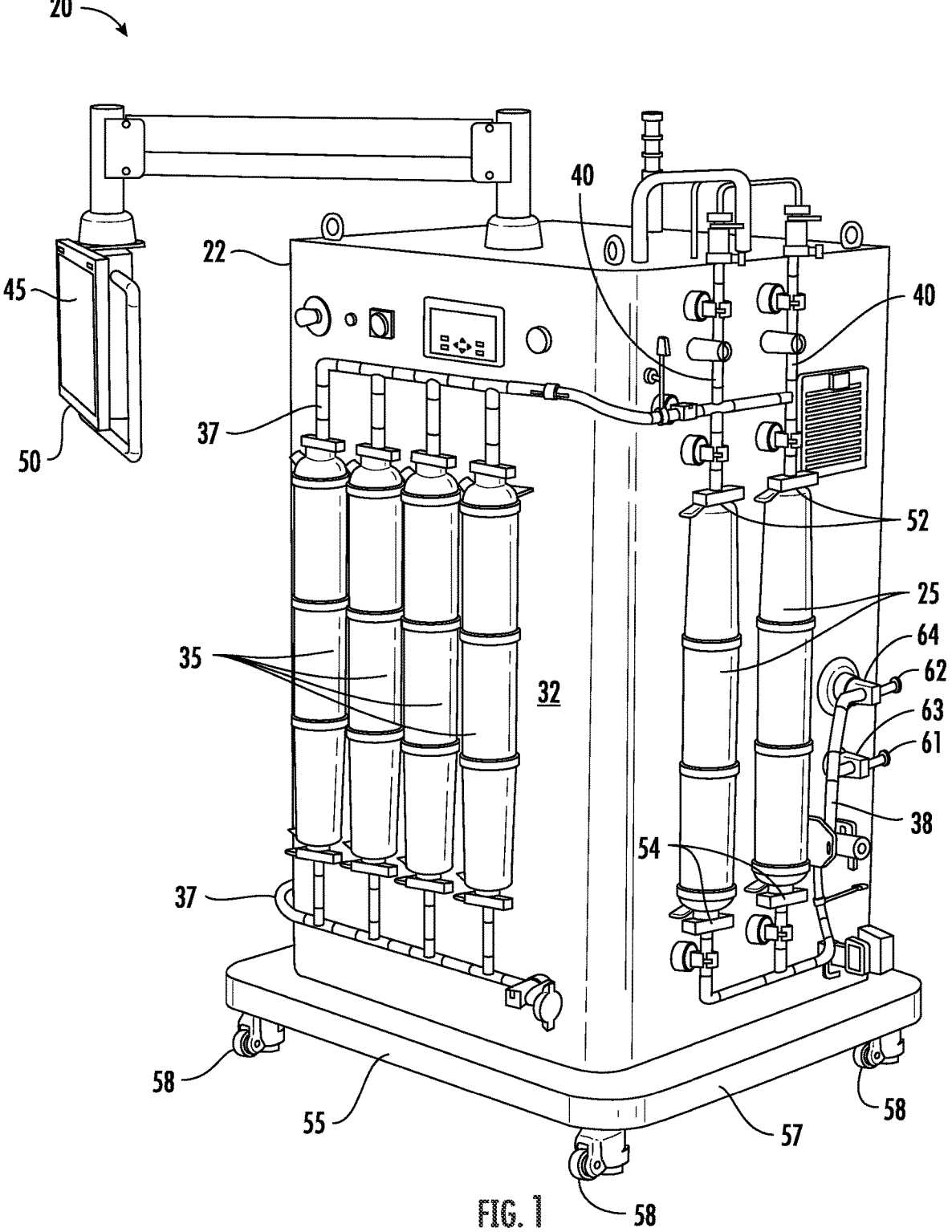
FIG. 1 is a perspective view of an embodiment of a filtration skid constructed in accordance with principles of the present disclosure, including an embodiment of a fluid filtration system constructed in accordance with principles of the present disclosure.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF THE INVENTION

Embodiments of a fluid filtration system constructed in accordance with principles of the present disclosure are adapted to be used with embodiments of a method of conducting in-situ integrity testing of a single use filter following principles of the present disclosure. In embodiments, the fluid filtration system is incorporated into a filtration skid including at least one single use filter mounted thereto and a filter integrity test ("FIT") device incorporated into the skid.

Embodiments of a fluid filtration system constructed in accordance with principles of the present disclosure can be used in biopharmaceutical environments, but can be used in other industrial applications where different fluids, solutions, reagents and/or chemicals are filtered. For example, embodiments of a fluid filtration system constructed in accordance with principles of the present disclosure are adapted to be used in a bioprocessing system in which a supply of fluid is separated and filtered in a bioprocessing application (such as a chromatography/tangential flow filtration (TFF) application, for example). Embodiments of a fluid filtration system constructed in accordance with principles of the present disclosure can be used to perform applications related to formulating, filling, and other applications related to filtering liquids in a sterile manner.

Embodiments of a fluid filtration system constructed in accordance with principles of the present disclosure are configured with a FIT device that is integrated into the filtration skid's control unit to enable repeatable, reliable fully-automated filter integrity testing with seamless processing of in-situ, pre- and post-use filter integrity testing. Embodiments of a fluid filtration system constructed in accordance with principles of the present disclosure are configured to perform live testing executed with the incorporated FIT device according to predetermined test protocols with no additional manual interaction necessary to perform FIT.

Embodiments of a fluid filtration system constructed in accordance with principles of the present disclosure include a FIT device incorporated into the filtration skid and configured to be used to help recover filtered product from the discharge conduit via directed application of a flow of pressurized gas, such as pressurized air or nitrogen, for example, through the filter by the FIT device. The product recovered as fluid can be pressed through the filter into the product outlet of the discharge conduit via operation of the FIT device through an established operational routine.

Turning now to the FIGURES, there is shown in FIGS. 1-4 an embodiment of a fluid filtration system 20 constructed in accordance with principles of the present disclosure that is incorporated into a workstation in the form of a filtration skid 22 constructed in accordance with principles of the present disclosure. In embodiments, the filtration skid 22 includes at least one single use filter 25 and an integrity test device 30 (see, e.g., FIG. 2) in selective fluid communication with the single use filter 25 for conducting at least one FIT.

Figure 2:
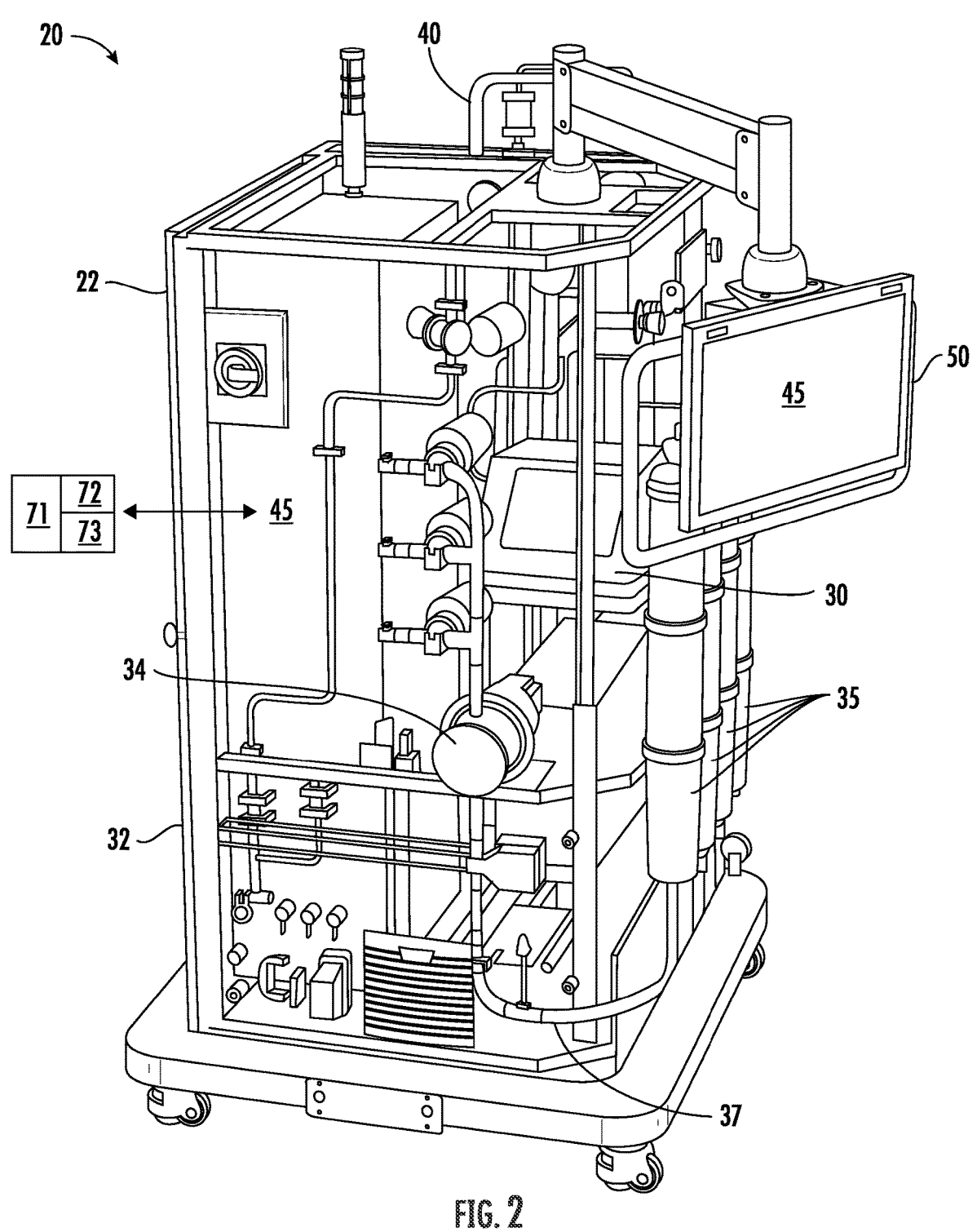
FIG. 2 is another perspective view of the filtration skid of FIG. 1, with a cabinet thereof illustrated in broken lines for illustrative purposes.
Figure 3:
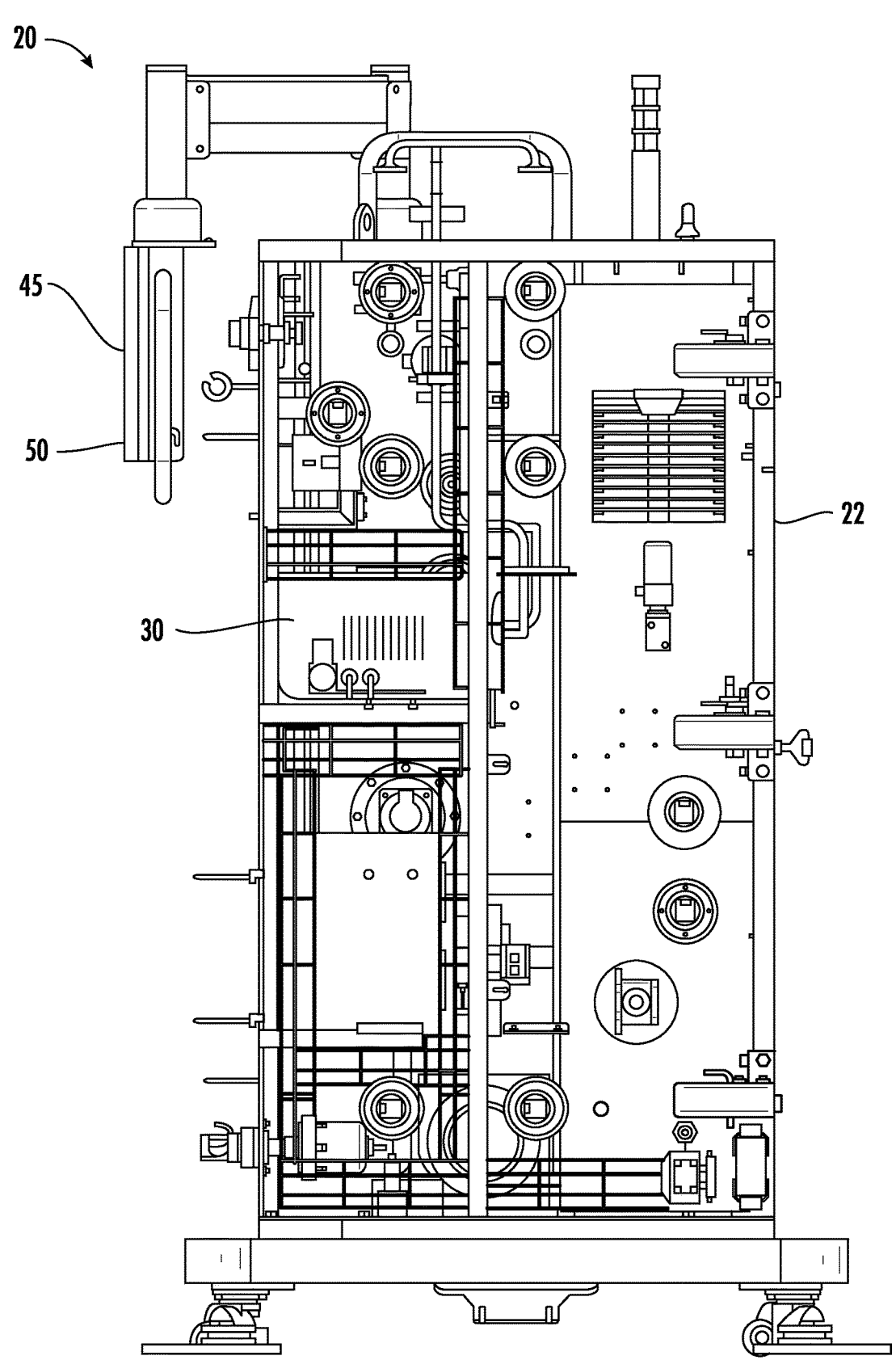
FIG. 3 is a side elevational view of the filtration skid of FIG. 1.
Figure 4:
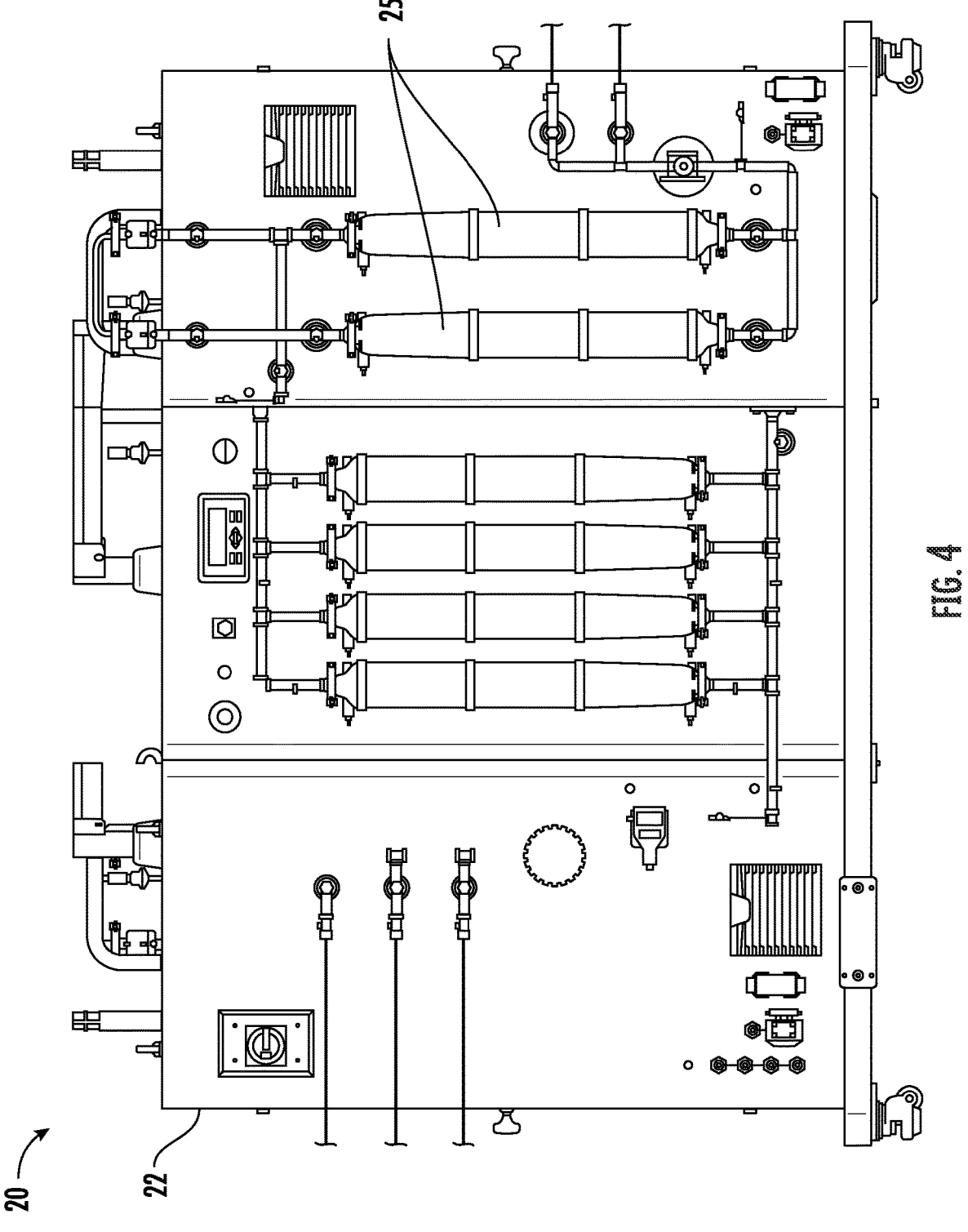
FIG. 4 is a schematic elevational view of three sides of the filtration skid of FIG. 1.

Referring to FIGS. 1-3, the illustrated filtration skid 22 includes a cabinet 32, a pump 34, a plurality of pre-filters 35, a pair of single use filters 25, a fluid supply conduit 37, a discharge conduit 38, an integrity test device 30, a test conduit 40, a control unit 45, and a display device 50. One skilled in the art will understand after reviewing the present disclosure that, in other embodiments, the system can have different configurations. For example, in embodiments, the pre-filters 35 can be omitted and/or only one single-use filter 25 can be provided.

In embodiments of a fluid filtration system 20 constructed in accordance with principles of the present disclosure, an upstream end 52 of each single use filter 25 is fluidly connected to the pump 34 via the fluid supply conduit 37 and to the integrity test device 30 via the test conduit 40. The pump 34 and the integrity test device 30 are supported by the cabinet 32. The integrity test device 30 is adapted to be fluidly connected to a source of pressurized gas. The integrity test device 30 is operable to direct a flow of pressurized gas through the test conduit 40 to perform a test operation on each single use filter 25. In embodiments, the test operation comprises one of a forward flow test, a water intrusion test, a bubble point test, a leak test, and a pressure decay test. In embodiments, the fluid filtration system 20 can be used with any suitable fluid, which can be stored in a suitable container, such as a tote, for example, which is in fluid communication with the pump 34.

Referring to FIG. 1, the filtration skid 22 includes a trolley 55. The cabinet 32 is mounted atop the trolley 55 and is configured to house hydraulic and automation equipment of the fluid filtration system 20. The trolley 55 includes a base 57 and a plurality of wheels 58 rotatably attached to the base 57. In the illustrated embodiment, the base 57 is rectangular, and there is a wheel 58 rotatably attached at each corner of the base 57. In embodiments, the base 57 can be substantially square-shaped.

The cabinet 32 is mounted to the base 57 of the trolley 55. In embodiments, the cabinet 32 comprises a storage unit for automation and hydraulic equipment and is made from a suitable metal, such as stainless steel, for example. The cabinet 32 defines an interior cavity which can be suitably configured for storing and supporting components of the liquid filtration system, including the integrity test device 30. Referring to FIG. 2, in embodiments, the cabinet 32 houses at least one pump body 34, the integrity test device 30, and the control unit 45.

The pump 34 is supported by the cabinet 32 and is adapted to selectively produce a flow of fluid. The pump 34 is configured to draw fluid from a supply of fluid(s) (not shown) and deliver it to the filters. The pump 34 is in operable relationship with the control unit 45 such that the control unit 45 can selectively operate the pump 34. The pump 34 is adapted to selectively produce a flow of fluid to deliver a supply of fluid to the filters. In embodiments, the pump 34 can be any suitable pump capable of producing a flow of fluid through the filters and that meets the specification of the intended application. In embodiments, the pump 34 comprises a variable displacement pump. In embodiments, the fluid filtration system 20 includes a plurality of pumps 34 which can be used to deliver one or more types of fluid to the filters 35, 25.

Referring to FIGS. 1 and 2, the pre-filters 35 are fluidly connected in parallel to the pump 34 via the fluid supply conduit 37. Referring to FIG. 1, the single use filters 25 are fluidly connected in parallel to the bank of pre-filters 35 via the fluid supply conduit 37. The bank of parallel pre-filters 35 are connected in series to the parallel pair of single use filters 25.

Referring to FIG. 1, in the illustrated embodiment, each conduit 37, 38, 40 comprises a tubing arrangement that fluidly interconnects various components of the fluid filtration system 20. In embodiments, the tubing arrangement comprises a plurality of flexible tubing lines adapted to be selectively occluded by a pinch valve externally mounted thereto. In embodiments, the flexible tubing can be made from any suitable material, such as, silicone, thermoplastic elastomer (TPE), etc. In embodiments, the conduits comprise a flexible, plastic-based (e.g. PVC, PP, PE) hose. In embodiments, the conduits comprise any one of a range of suitable materials and assemblies as will be readily known to one of ordinary skill in the art, such as, e.g., silicone tubing, plastic injection molded adapters, and commercially-available connectors and disconnectors (e.g., Kleenpack® Presto sterile connectors and Kleenpack® sterile disconnectors from Pall Corporation of Port Washington, New York), and those disclosed in U.S. Patent Application Publication No. US 2017/0284584.

In embodiments, the filtration skid 22 can have a number of valve arrangements associated with the conduits. In embodiments, each conduit 37, 38, 40 can be associated with control valves in electrical communication with the control unit 45, which in turn is configured to control the operational condition of the valves between an open and closed condition to direct the flow of fluid therethrough. The valves can comprise any suitable valve adapted to selectively occlude the conduit with which it is associated.

In the illustrated embodiment, the valves comprise pinch valves adapted to control the flow of fluid within the system by occluding the tubing of the conduit to effectively occlude conduit with which it is associated. The valves are secured to the skid 22 and can provide the means for removably mounting the conduits 37, 38, 40 to the skid 22. The valves are supported by the cabinet 32 such that a clamping portion of each valve projects from an exterior surface of the cabinet 32 for being respectively associated with a conduit. In other embodiments, a different type of valve can be used, as will be readily familiar to one skilled in the art, such as a solenoid valve, for example. In embodiments, the valves can be operated by a suitable source, such as, a pneumatic source or an electrical power source, for example. In embodiments, the operation of the valves of the filtration skid 22 can be coordinated via the control unit 45 which is suitably programmed to operate one or more desired fluid distributing sequences.

Referring to FIG. 1, the pre-filters 35 and the single use filters 25 are removably mounted to the cabinet 32. In the illustrated embodiment, the filtration skid 22 includes four pre-filters 35 and two single use filters 25. In other embodiments, the filtration skid 22 can include a different number of pre-filters 35 and/or single use filters 25, including one pre-filter 35 and/or one single use filter 25. In embodiments, the pre-filter 35 can be omitted.

Referring to FIG. 1, each single use filter 25 is removably mounted to the workstation 22. Each single use filter 25 has an upstream end 52 and a downstream end 54. The upstream end 52 of each single use filter 25 is in fluid communication with the pump 34 via the fluid supply conduit 37 (see also FIG. 2). The downstream end 54 of each single use filter 25 is in fluid communication with the discharge conduit 38

In the illustrated embodiment, each single use filter 25 comprises a replaceable part that is installed once in the filtration skid 22 for use in a bioprocessing application and uninstalled thereafter for disposal thereof. After completing its intended use in the bioprocessing application, the respective single use filter 25 can be disconnected from the filtration skid 22 and replaced with another single use filter 25 having a similar construction. In embodiments, the filters 25 comprise any one of a range of suitable materials and assemblies as will be readily known to one of ordinary skill in the art.

A variety of commercially-available filters, filter media (e.g., fibrous media, membranes, and/or composites), filter elements, filter modules, and filter sizes are suitable for use as the pre-filter 35 and the single use filter 25 in embodiments of a fluid filtration system constructed according to principles of the present disclosure. Suitable filters include, for example, Pegasus Prime filters commercially available from Pall Corporation of Port Washington, New York. Exemplary filters and filter elements include pleated filters and "laid-over-pleat" (LOP) filter configurations.

In embodiments, the pre-filter 35 and the single use filter 25 comprise a filter and filter element having any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

In embodiments, the pre-filter 35 and the single use filter 25 comprise a filter and filter element having any desired critical wetting surface tension (CWST, as defined in, for example, U.S. Pat. No. 4,925,572). The porous membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface.

In embodiments, the pre-filter 35 and the single use filter 25 can include additional elements, layers, or components, that can have different structures and/or functions, e.g., at least one of the following: prefiltration, support, drainage, spacing and cushioning. Illustratively, in embodiments, the pre-filter 35 and the single use filter 25 can also include at least one additional element such as a mesh and/or a screen.

In embodiments, the pre-filter 35 and the single use filter 25 comprise a plurality of filter elements (typically, the filter is arranged between an outer cage and an inner core to provide a filter module) disposed in a housing comprising an inlet and an outlet and defining a fluid flow path between the inlet and the outlet, wherein the filter is across the fluid flow path. Preferably, the pre-filter 35 and the single use filter 25 are sterilizable as is known in the art (e.g., autoclaved, gamma irradiated, etc.). Any housing of suitable shape and providing an inlet and an outlet may be employed.

Referring to FIG. 1, the discharge conduit 38 is in fluid communication with the downstream end 54 of each single use filter 25. The discharge conduit 38 includes a first outlet 61 and a second outlet 62 and a first outlet valve 63 and a second outlet valve 64 respectively associated with the first outlet 61 and the second outlet 62. The first outlet 61 is adapted for fluid connection to a product container, and the second outlet 62 is adapted for fluid connection to a waste repository.

Referring to FIG. 2, the integrity test device 30 is supported by the cabinet 32 and is in fluid communication with the upstream end 52 of each single use filter 25 via the test conduit 40 (see also FIG. 1). The integrity test device 30 is adapted to be connected to a source of pressurized gas, such as pressurized air or nitrogen, for example, and to selectively direct a flow of pressurized gas through the respective test conduit 40 to each single use filter 25. The test conduit 40 can comprise a high pressure manifold section located upstream of the single use filters 25 configured to selectively deliver pressurized gas to one or both of the single use filters 25. The test conduit 40 can include a stainless steel gas line from the integrity test device 30 to the manifold section.

In embodiments, any integrity test device 30 suitable for performing the intended integrity testing can be used. In embodiments, a commercially-available integrity test device configured to conduct pre- and post-use integrity testing can be used. In embodiments, a variety of integrity test instruments are suitable for use, such as, for example, a PALL-TRONIC Flowstar IV Filter integrity test instrument, a PALLTRONIC Flowstar IV Filter integrity test instrument MUX Extension, a PALLTRONIC Flowstar LGR test instrument, or a PALLTRONIC AquaWIT IV Filter Integrity Test System, which are commercially available from Pall Corporation of Port Washington, New York.

In embodiments, the integrity test device 30 is configured to conduct a variety of filter integrity tests (FIT) as will be familiar to one skilled in the art, including pre-use post sterilization and post-use tests. In embodiments, the integrity test device 30 is configured to conduct a FIT designed to ensure consistent filtration performance according to a regulatory body (e.g. FDA). In embodiments, the integrity test device 30 is configured to perform at least one FIT in accordance with a regulatory protocol to ensure filter performance according to a regulated performance specification. In embodiments, the integrity test device 30 is configured to perform each one of the following tests according to at least one predetermined protocol: a forward flow test, a water intrusion test, a bubble point test, a leak test, and a pressure decay test.

Referring to FIG. 2, in embodiments, the control unit 45 can comprise any suitable equipment configured to control the operation of at least one component of the liquid filtration system 20 when performing a filtering operation. In embodiments, the control unit 45 includes a processor 71, a non-transitory computer readable medium 72 bearing a fluid filtration program, a data storage device 73, and the display device 50. The processor 71 is arranged with the computer readable medium 72 to execute the fluid filtration program. The processor 71 is in operable arrangement with the display device 50 to selectively display output information from the fluid filtration program and/or to receive input information from a graphical user interface displayed by the display device 50.

In embodiments, the processor 71 of the control unit 45 comprises both a separate processor and a processor included in the integrity test device 30. In embodiments, the fluid filtration program includes an integrity test program. In embodiments, the integrity test device 30 includes a non-transitory computer readable medium bearing the integrity test program. The processor 71 is arranged with the computer readable medium 72 to execute the integrity test program. The processor 71 is in electrical communication with the integrity test device 30 to selectively operate the integrity test device 30 to perform a test operation on each single use filter 25 using the flow of pressurized gas based upon instructions from the integrity test program.

The processor 71 can be configured to act as a controller to selectively operate at least one component of the fluid filtration system 20, such as the pump 34 and the valve arrangements, for example. In embodiments, the processor 71 is in electrical communication with the pump(s) and the valve arrangements to selectively operate the valves based upon instructions from the fluid filtration program.

In embodiments, a controller and the processor 71 can comprise separate devices, and the controller can be in operable communicative arrangement with the processor 71. In embodiments, the controller can include a user input and/or interface device having one or more user-actuated mechanisms (e.g., one or more push buttons, slide bars, rotatable knobs, a keyboard, and a mouse) adapted to generate one or more user actuated input control signals. In embodiments, the controller can be configured to include one or more other user-activated mechanisms to provide various other control functions for the fluid filtration system, as will be appreciated by one skilled in the art. The controller can be associated with the display device 50 which is adapted to display a graphical user interface. The graphical user interface can be configured to function as both a user input device and a display device in embodiments. In embodiments, the display device 50 can comprise a touch screen device adapted to receive input signals from a user touching different parts of the display screen. In embodiments, the controller can be in the form of a smart phone, a tablet, a personal digital assistant (e.g., a wireless, mobile device), a laptop computer, a desktop computer, or other type of device.

In embodiments, the processor 71 can comprise any suitable computing device(s), such as, a microprocessor, a mainframe computer, a digital signal processor, a portable computing device, a personal organizer, a device controller, a logic device (e.g., a programmable logic device configured to perform processing functions), a digital signal processing (DSP) device, or a computational engine within an appliance. In embodiments, the processor 71 also includes one or more additional input devices (e.g., a keyboard and a mouse).

The processor 71 can have one or more memory devices associated therewith to store data and information. The one or more memory devices can include any suitable type, including volatile and non-volatile memory devices, such as RAM (Random Access Memory), ROM (Read-Only Memory), EEPROM (Electrically-Erasable Programmable Read-Only Memory), flash memory, etc.

In embodiments, the control unit 45 is in electrical communication with each pump 34 used to deliver the fluid(s) to the filters 35, 25 and with each valve of the valve arrangements. The control unit 45 is configured to selectively operate the pump 34 and the valves according to logic and operation parameters contained in the fluid filtration program. In embodiments, the control unit 45 is configured to control at least one of a pump speed and a volume displacement of the pump 34 to control the amount of fluid being delivered to the single use filters 25. In the illustrated embodiment, the control unit 45 is configured to independently operate each valve of the different valve arrangements.

In embodiments, the processor 71 comprises a specially programmed processor that can be used to facilitate the control and the operation of the fluid filtration system 20. In embodiments, the processor 71 can be configured to receive input signals from the controller, to send input control signals to the controller, and/or to send output information to the controller. In the illustrated embodiment, the controller and the processor 71 comprise the same device, and the integrity test device 30 includes its own processor that can be controlled by the processor 71.

In one embodiment, the processor 71 is adapted to execute programming stored upon the non-transitory computer readable medium 72 to perform various methods, processes, and modes of operations in a manner following principles of the present disclosure. In embodiments, the non-transitory computer readable medium 72 can contain a fluid filtration program that is configured to implement an embodiment of a method of filtering fluid according to principles of the present disclosure. In embodiments, the fluid filtration program is configured to perform at least one fluid filtering operation. In embodiments, the fluid filtration program is configured to perform at least one fluid recovery operation.

In embodiments, the fluid filtration program includes a graphical user interface that can be displayed by the display device 50. The graphical user interface can be used to facilitate the inputting of commands and data by a user to the fluid filtration program and to display outputs generated by the fluid filtration program.

The fluid filtration program can be stored upon any suitable computer-readable storage medium. For example, in embodiments, a fluid filtration program following principles of the present disclosure can be stored upon a hard drive, floppy disk, CD-ROM drive, tape drive, zip drive, flash drive, optical storage device, magnetic storage device, and the like.

In embodiments, the processor 71 is in operable communication with the data storage device 73 which includes at least one database containing fluid filtration data. In embodiments, the fluid filtration program can be configured to store the fluid filtration data generated during operation of the system in the data storage device 73. In embodiments, the fluid filtration data can be associated in a logical manner with time data in the data storage device such that the various data can be retrievable for a given time.

The display device 50 is in operable arrangement with the processor 71. In embodiments, the integrity test program is configured to perform the following steps as part of a test operation when executed by the processor 71: determine whether each single use filter 25 satisfied the test operation, generate a graphical display containing a graphical indication of whether the single use filter 25 satisfied the test operation, display the graphical display on the display device 50 (see, e.g., FIG. 7).

In embodiments, the processor 71 is configured to display in the display device 50 fluid filtration data received from the integrity test device 30 and from at least one sensor in electrical communication with the control unit 71. The fluid filtration data can also be stored in the data storage device 73 operably arranged with the processor 71.

Figure 5:
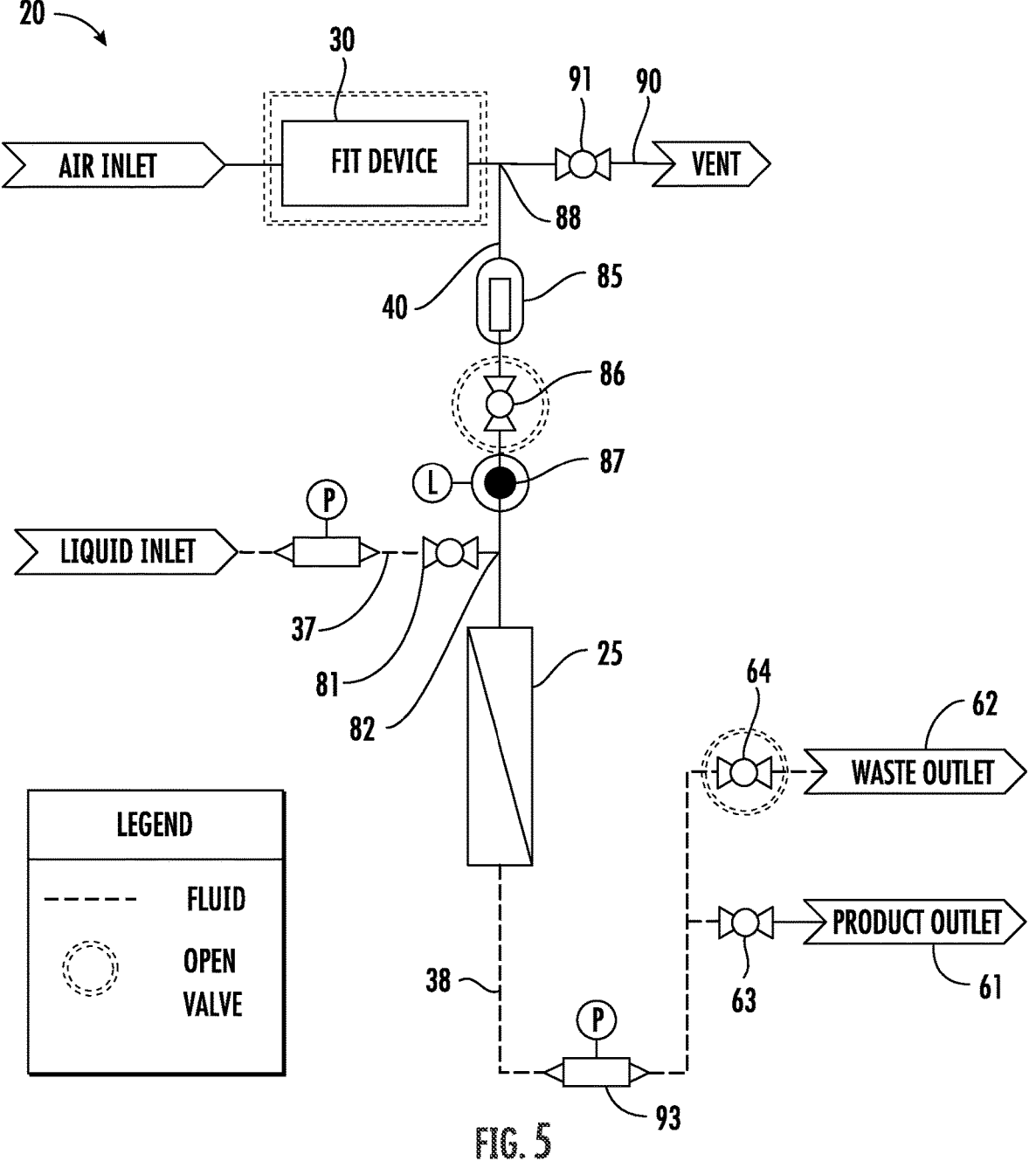
FIG. 5 is a schematic diagram of an embodiment of a fluid filtration system constructed in accordance with principles of the present disclosure, illustrating a filter integrity test operation.

FIG. 5 is a schematic diagram of an embodiment of a fluid filtration system 20 constructed in accordance with principles of the present disclosure that illustrates a filter integrity test operation. The illustrated arrangement includes one single use filter 25. It should be understood that the description of this arrangement (as well as those shown in FIGS. 6 and 8-12) is applicable to each single use filter 25 included in a particular embodiment of a fluid filtration system constructed according to principles of the present disclosure.

The fluid supply conduit 37 includes a fluid supply valve 81 and a test junction 82. The test conduit 40 is fluidly connected to the single use filter 25 via the test junction 82 of the fluid supply conduit 37.

The test conduit 40 includes an air filter 85, a test conduit valve 86, and a liquid sensor 87. The air filter 85 is configured to filter particulate from fluid passing through the filter 85. The air filter 85 is disposed between the integrity test device 30 and the single use filter 25 such that the pressurized gas delivered to the single use filter 25 via the integrity test device 30 is filtered through the air filter 85. The test conduit 40 includes the liquid sensor 87 and the test conduit valve 86 to protect the air filter 85 from exposure to liquid.

The liquid sensor 87 is configured to generate a liquid detection signal in response to detecting liquid in the test conduit 40. The control unit 45 is in electrical communication with the liquid sensor 87 to receive the liquid detection signal therefrom. The test conduit valve 86 is arranged with the test conduit 40 to selectively occlude the test conduit 40.

The liquid sensor 87 is disposed between the integrity test device 30 and the test junction 82, and in particular between the air filter 85 and the test junction 82. The test conduit valve 86 is disposed between the air filter 85 and the liquid sensor 87.

The test conduit valve 86 is in operable arrangement with the control unit 45 such that the control unit 45 can operate the test conduit valve 86 in response to receiving the liquid detection signal. In embodiments, the control unit 45 is configured to cease operation of the pump(s) 34 and/or close the test conduit valve 86 in response to receiving the liquid detection signal to prevent the air filter 85 from becoming wetted with fluid.

In embodiments, the fluid filtration system 20 can include means for removing gas trapped within the conduits to enhance the accuracy and consistency of the fluid filtering process. In the illustrated embodiment, the test conduit 40 also includes a vent junction 88 for fluid communication with a vent conduit 90. The vent conduit 90 is in fluid communication with the test conduit 40 via the vent junction 88.

The vent conduit 90 includes a vent valve 91. The vent valve 91 is in operable arrangement with the control unit 45 such that the control unit 45 can selectively operate the vent valve 91.

In embodiments, the integrity test program is configured to perform the following steps as part of the test operation when executed by the processor 71: close the fluid supply valve 81 to occlude the fluid supply conduit 37, open the test conduit valve 86 to open the test conduit 40, open the second outlet valve 64 to permit air flow through the single use filter 25, and operate the integrity test device 30 to direct the flow of pressurized gas through the test conduit 40 and through the single use filter 25. In embodiments, the test operation comprises one of a forward flow test, a water intrusion test, a bubble point test, a leak test, and a pressure decay test. In embodiments, the integrity test program is configured to perform the following step as part of the test operation when executed by the processor: close the vent valve 91 to occlude the vent conduit 90.

In embodiments, the integrity test program can be configured to perform the following steps as part of the test operation when executed by the processor: close the first outlet valve 63 to occlude the first outlet 61, and open the second outlet valve 64 to open the second outlet 62. In embodiments, the integrity test program can omit performance of the foregoing steps, but they are helpful to avoid unwanted fluid in the product outlet (that can cause unnecessary/unwanted dilution). In other embodiments, the integrity test program can be configured to perform the reverse of the foregoing steps as part of the test operation when executed by the processor, namely, open the first outlet valve 63 to open the first outlet 61, and close the second outlet valve 64 to close the second outlet 62.

The discharge conduit 38 includes a pressure sensor 93. The pressure sensor 93 is configured to generate a pressure signal indicative of the pressure measured in the discharge conduit 38. The control unit 45 is in electrical communication with the pressure sensor 93 to receive the pressure signal therefrom. In embodiments, the pressure sensor 93 can be used to confirm that the discharge conduit 38 is unpressurized.

In embodiments, the FIT device 30 includes an internal pressure sensor that can be operated independently to sense the pressure in the test conduit 40. In embodiments, the integrity test program is configured to determine whether a test condition of the test operation is satisfied based upon the pressure measured by the pressure sensor of the FIT device 30 within the upstream part of the single use filter 25 in the area of the test junction 82.

Figure 6:
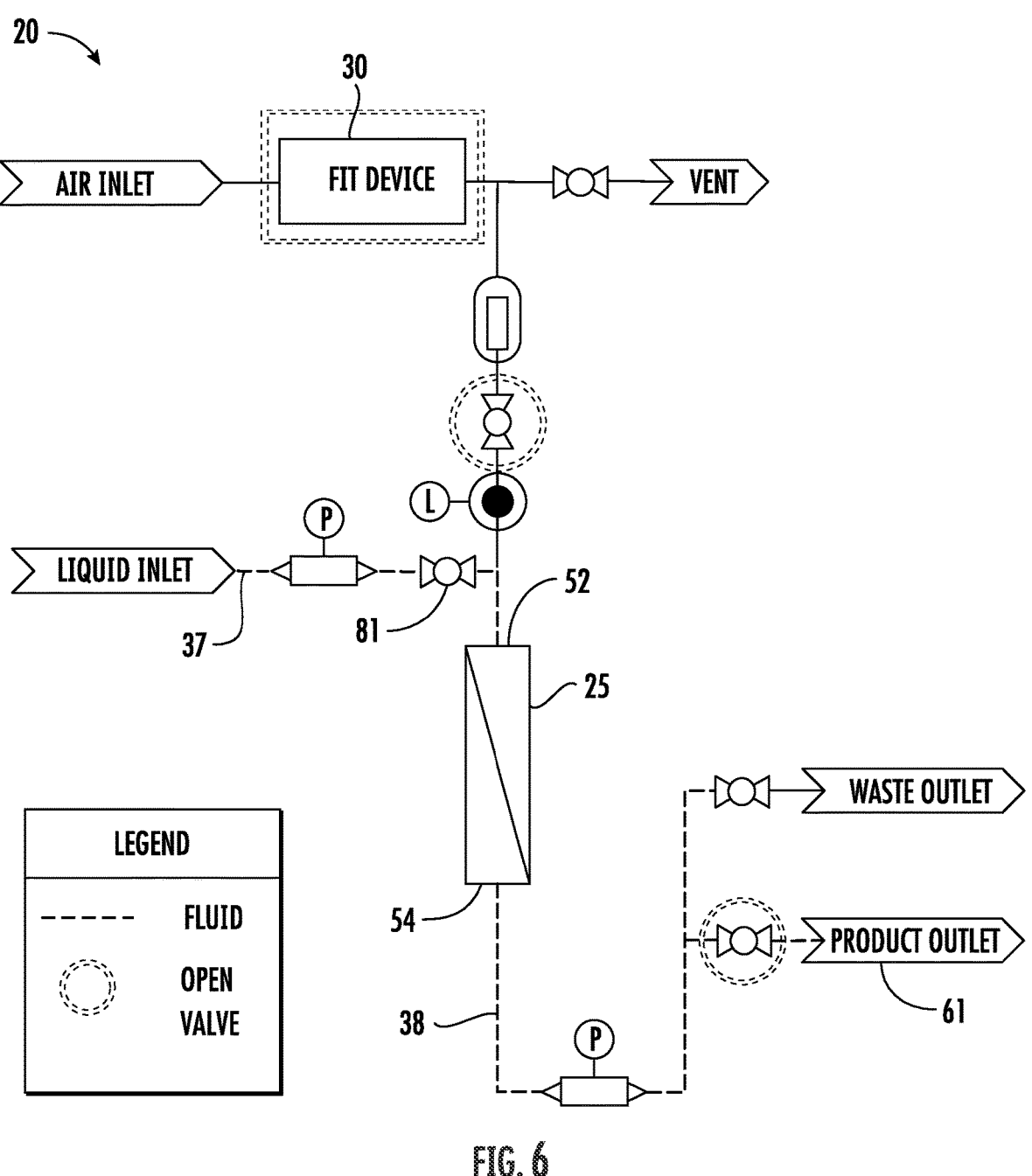
FIG. 6 is a schematic diagram of the fluid filtration system as in FIG. 5, illustrating a fluid recovery operation.

In embodiments, the fluid filtration system 20 can include means for recovering fluid from the single use filter that would otherwise be retained therein or not be discharged during the filtering operation. FIG. 6 is a schematic diagram of the fluid filtration system 20 illustrating a fluid recovery operation. Post-use, the fluid filtration system 20 can be operated to recover fluid from the single use filter 25 by directing pressurized gas through the filter 25. The fluid supply valve 81 can be closed such that fluid is prevent from flowing to the upstream end 52 of the single use filter 25 from the fluid supply conduit 37. The fluid supply valve 81 can be closed to ensure that the pressure (air) provided by the FIT device 30 is used to recover product from the single use filter 25 (and not flow/escape through the fluid supply conduit 37). Pressurized gas can be delivered by the integrity test device 30 through the single use filter 25. The product outlet of the discharge conduit 38 can be opened such that fluid driven from the single use filter 25 is conveyed from the downstream end 54 of the filter 25 through the discharge conduit 38 and out of the product outlet 61. In other embodiments, a separate source of pressurized gas can be provided for performing the fluid recovery operation.

Figure 7:
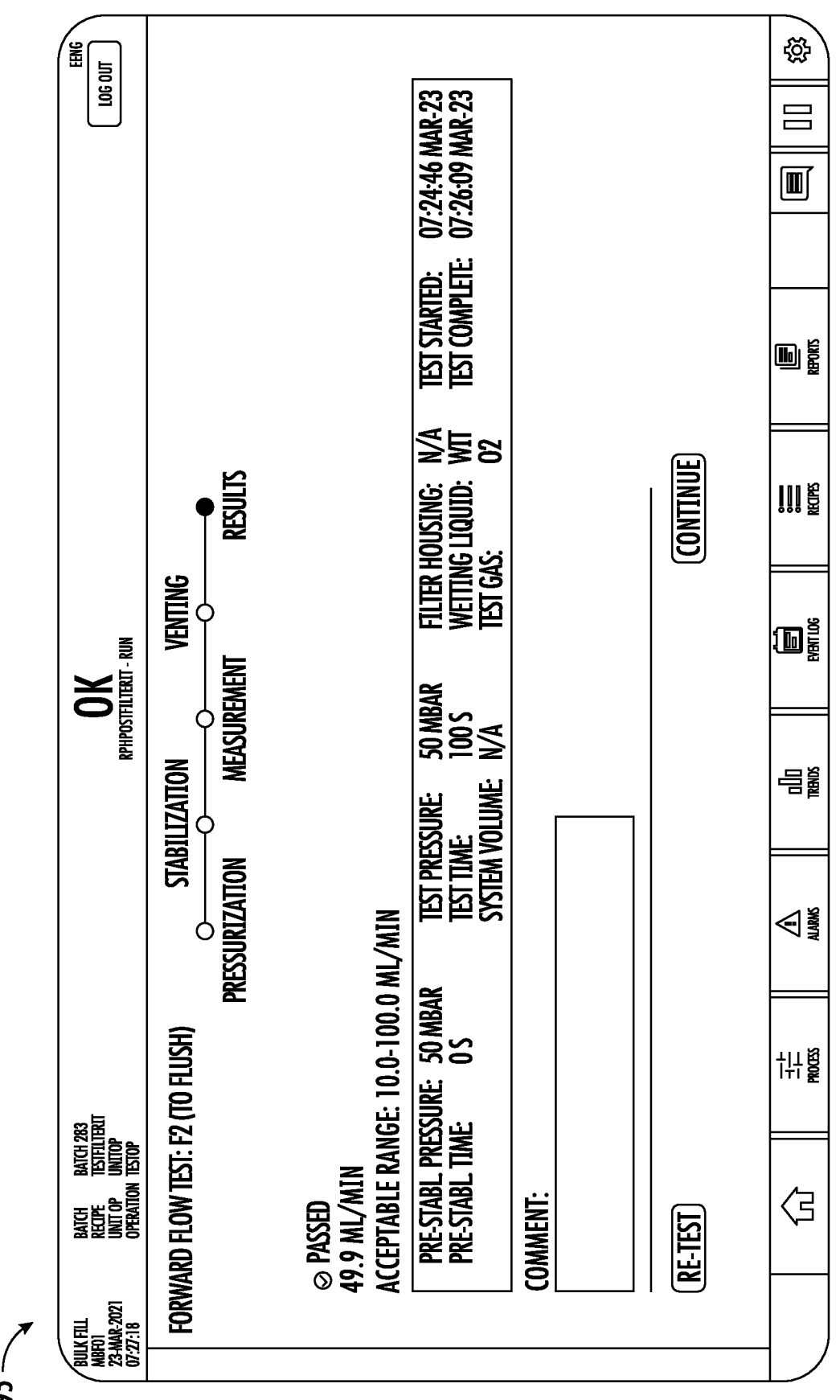
FIG. 7 is a view of an embodiment of a graphical user interface suitable for use with an integrity test program constructed according to principles of the present disclosure.

FIG. 7 is a view of an embodiment of a graphical user interface 95 suitable for use with an integrity test program constructed according to principles of the present disclosure. In embodiments, the integrity test program is configured to determine whether the single use filter 25 satisfied the test operation, generate a graphical display containing a graphical indication of whether the single use filter 25 satisfied the test operation, display the graphical display on the display device 50. The graphical user interface 95 is an example of such a graphical display.

In other embodiments, the fluid filtration system can include different and additional equipment configured to hold the supply of fluid for delivery to the single use filters. For example, in other embodiments, a fluid filtration system constructed according to principles of the present disclosure can include at least one tower configured to hold one or more totes filled with a fluid for use with the fluid filtration system. In other embodiments, a fluid filtration system constructed according to principles of the present disclosure can include one or more tanks filled with a fluid for use in the system.

In other embodiments of a fluid filtration system constructed in accordance with principles of the present disclosure, the fluid filtration system construction can take alternatives forms. For example, in embodiments, the fluid filtration system can be scaled for larger volumes or decreased for laboratory usage. In embodiments, a fluid filtration system constructed according to principles of the present disclosure can be used to process a variety of liquids to meet the requirements of a desired application.

In embodiments of a method of using a fluid filtration system following principles of the present disclosure, any suitable embodiment of a fluid filtration system according to principles discussed herein can be used. In embodiments, a method of using a fluid filtration system following principles of the present disclosure comprises using a filtration skid having a FIT device integrated therein according to principles of the present disclosure. In embodiments, a method of using a fluid filtration system following principles of the present disclosure comprises integrity testing a single use filter in-situ.

In one embodiment, a method of conducting in-situ integrity testing of a single use filter includes removably mounting a single use filter to a workstation. The workstation includes a cabinet. An upstream end of the single use filter is fluidly connected to a pump via a fluid supply conduit and to an integrity test device via a test conduit. The pump and the integrity test device are supported by the cabinet. The integrity test device is fluidly connected to a source of pressurized gas, such as pressurized air or nitrogen, for example. The integrity test device is operated to direct a flow of pressurized gas through the test conduit to perform a test operation on the single use filter. In embodiments, the test operation comprises one of a forward flow test, a water intrusion test, a bubble point test, a leak test, and a pressure decay test. In embodiments, operating the integrity test device to perform the test operation includes determining whether a test condition of the test operation is satisfied based upon the pressure measured within the discharge conduit. In embodiments, the FIT device 30 is configured to determine PASS or FAIL of the test based on the selected test method (forward flow, bubble point, pressure decay, etc.) and related test parameters (e.g. pressure, flow, etc.).

In embodiments, the integrity test device is operated to perform the test operation by executing an integrity test program stored upon a non-transitory computer-readable medium using a processor. In embodiments, the processor executes the integrity test program to determine whether the single use filter satisfied the test operation. A graphical display containing a graphical indication of whether the single use filter satisfied the test operation is generated. The graphical display is displayed on a display device.

In embodiments, the fluid supply conduit includes a fluid supply valve and a test junction. The test conduit includes a test conduit valve, and the test conduit is fluidly connected to the single use filter via the test junction of the fluid supply conduit. In embodiments, the method further includes closing the fluid supply valve to occlude the fluid supply conduit during the test operation. The test conduit valve is opened to open the test conduit during the test operation.

In embodiments, the test conduit includes a vent junction. In embodiments, the method further includes closing a vent valve to occlude a vent conduit during the test operation. The vent conduit is in fluid communication with the test conduit via the vent junction. In embodiments, the method further includes opening the vent valve to open the vent conduit after completing the test operation to permit pressurized gas upstream of the single use filter to vent out of the test conduit into the vent conduit.

In embodiments, a discharge conduit is in fluid communication with a downstream end of the single use filter. The discharge conduit includes first and second outlets and first and second outlet valves respectively associated with the first and second outlets. In embodiments, the method further includes closing a first outlet valve to occlude the first outlet, the first outlet fluidly connected to a product container. The second outlet valve is opened to open the second outlet. The second outlet is fluidly connected to a waste repository.

In embodiments, the method further includes measuring a pressure within the discharge conduit. In embodiments, operating the FIT device does not include measuring the pressure within the discharge conduit 38 (downstream of the single use filter 25). The discharge conduit 38 is understood to be unpressurized as the waste outlet 62 is unpressurized.

In embodiments, the FIT device 30 has an internal flow sensor and an internal pressure that can be operated to determine the pressure in the test conduit 40 and upstream part of the single use filter 25 in the area of the test junction 82. In embodiments, the method includes measuring a pressure within the test conduit upstream of the single use filter. In embodiments, operating the integrity test device to perform the test operation includes determining whether a test condition of the test operation is satisfied based upon the pressure measured within the test conduit.

In embodiments, a discharge conduit 38 is in fluid communication with a downstream end of the single use filter 25. The discharge conduit 38 includes a first outlet and a second outlet and a first outlet valve and a second outlet valve respectively associated with the first outlet and the second outlet. In embodiments, the method further includes closing the first outlet valve to occlude the first outlet. The first outlet is fluidly connected to a product container for receiving filtered fluid for end use. The second outlet valve is opened to open the second outlet. The second outlet is fluidly connected to a waste repository. In other embodiments, the method further includes opening a first outlet valve to open the first outlet. The first outlet is fluidly connected to a product container. The second outlet valve is closed to occlude the second outlet. The second outlet is fluidly connected to a waste repository.

Figure 8:
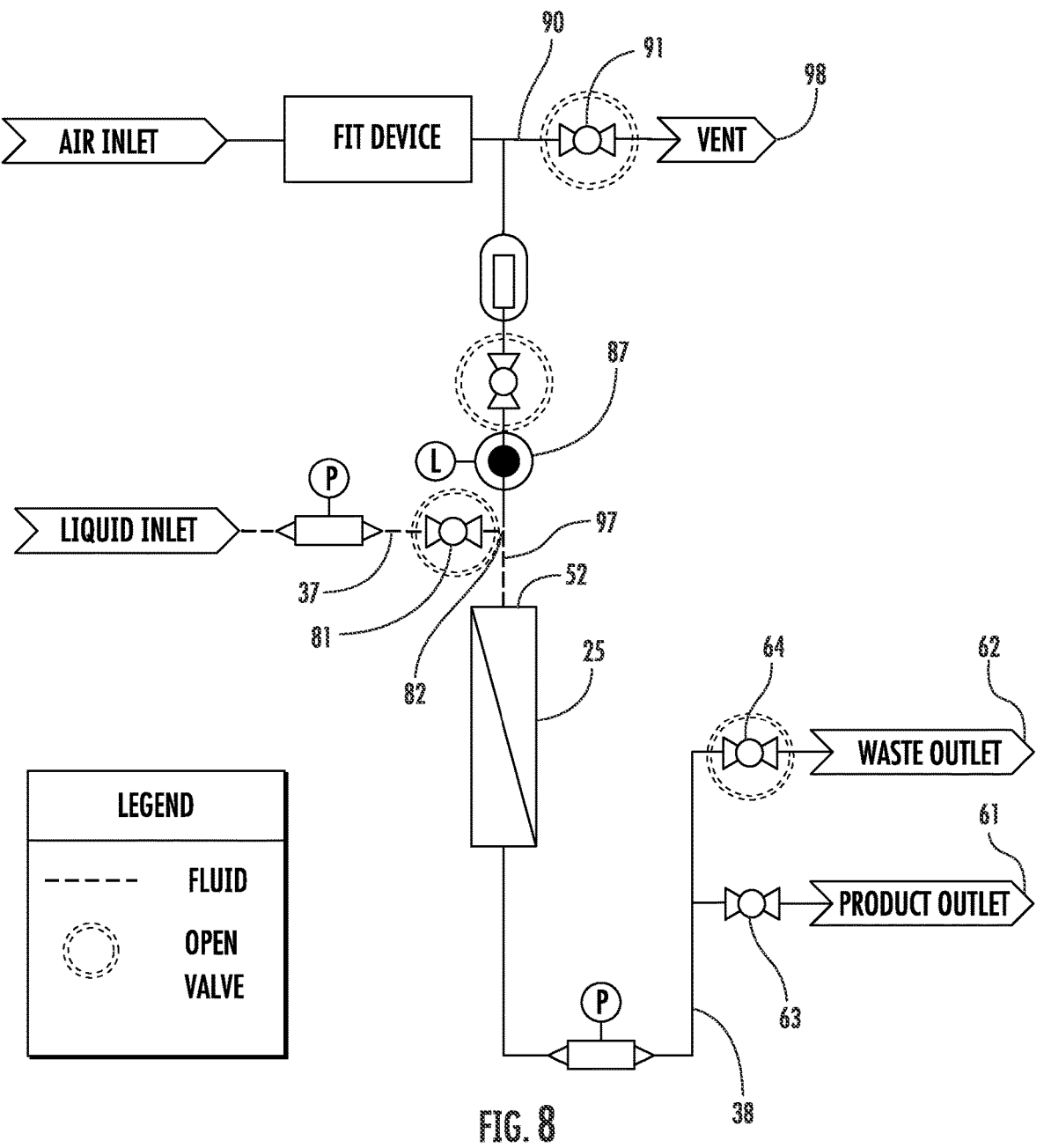
FIGS. 8 and 9 are schematic diagrams of the fluid filtration system as in FIG. 5, illustrating an upstream filter priming operation.
Figure 9:
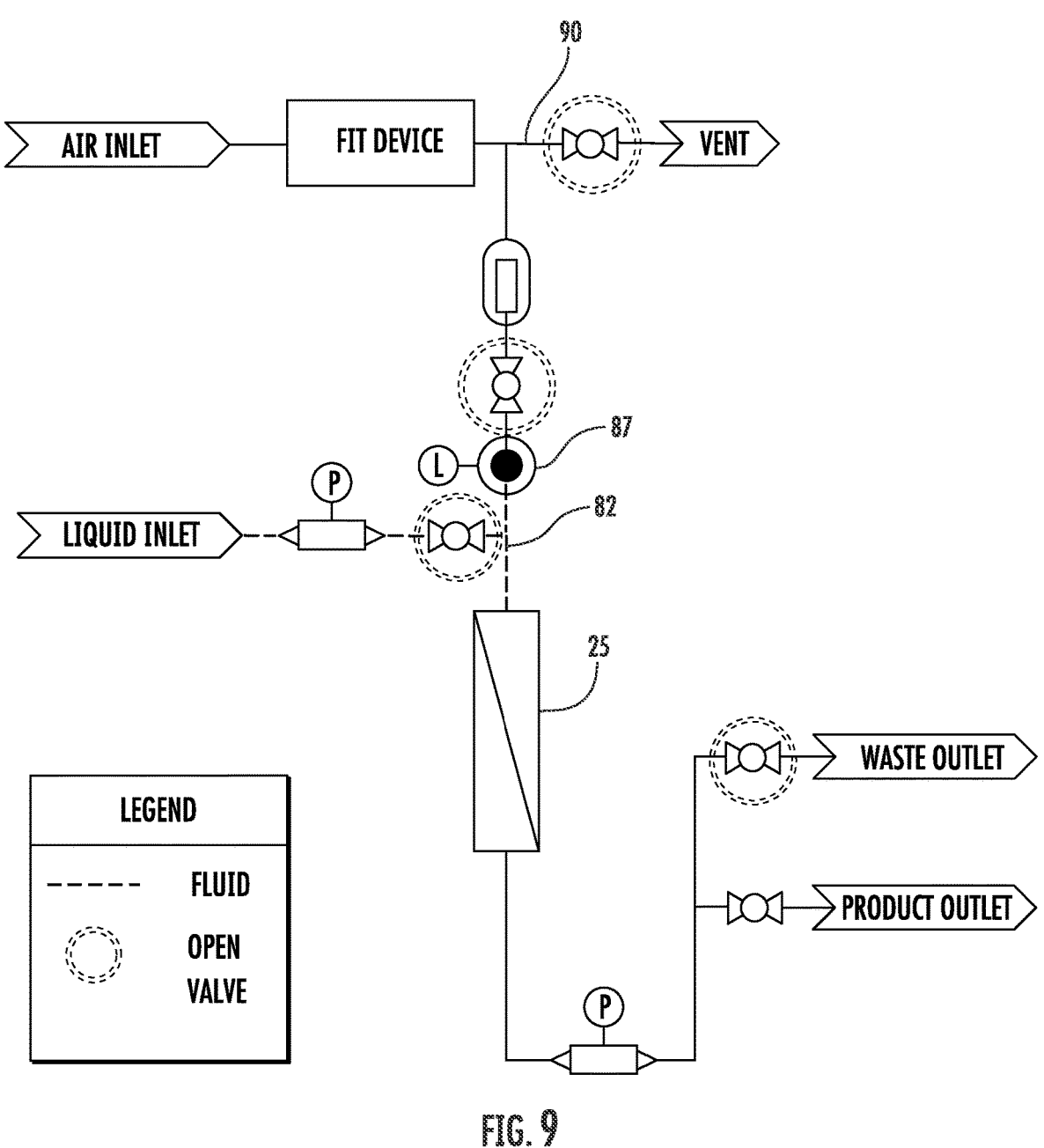

Referring to FIGS. 8-12, a series of filter conditioning sequences is shown. FIGS. 8 and 9 are schematic diagrams of the fluid filtration system as in FIG. 5, illustrating an upstream filter priming operation.

Referring to FIG. 8, the upstream end 52 of the single use filter 25 is in fluid communication with the pump 34 via the fluid supply conduit 37. The vent conduit 90 is in fluid communication with the junction 82 of the fluid supply conduit 37 such that the upstream end 52 of the single use filter 25 is in fluid communication with the vent conduit 90 via the junction 82 and a common branch 97 extending between the junction 82 and the upstream end 52 of the single use filter 25. The vent conduit 90 includes an outlet 98, the liquid sensor 87, and the vent valve 91. The liquid sensor 87 is disposed between the junction 82 and the outlet 98. The vent valve 91 is disposed between the liquid sensor 87 and the outlet 98. The liquid sensor 87 is configured to generate a liquid detection signal in response to detecting liquid in the vent conduit 90.

The control unit 45 is in electrical communication with the liquid sensor 87 to receive the liquid detection signal therefrom. In embodiments, the control unit 45 is programmed with the filter conditioning program which contains a filter priming module. The processor 71 is in electrical communication with the pump 34, the fluid supply valve 81, the vent valve 91, and the liquid sensor 87 to perform a priming operation on the single use filter 25 based upon instructions from the filter priming module.

In embodiments, the filter priming module is configured to perform the following steps when executed by the processor 71: open the fluid supply valve 81 to open the fluid supply conduit 37, open the vent valve 91 to open the vent conduit 90, close the first outlet valve 63 to occlude the first outlet 61 of the discharge conduit 38, open the second outlet valve 64 to open the second outlet 62 of the discharge conduit 38, operate the pump 34 to deliver the flow of fluid to the upstream end 52 of the single use filter 25 such that air in the fluid supply conduit 37 is displaced to the vent conduit 90, cease operation of the pump 34 and/or close the vent valve 91 in response to receiving the liquid detection signal.

Referring to FIG. 9, the liquid has risen above the junction 82 and is extending toward the liquid sensor 87, thereby indicating that air upstream of the single use filter 25 has been removed out through the vent conduit 90.

Figure 10:
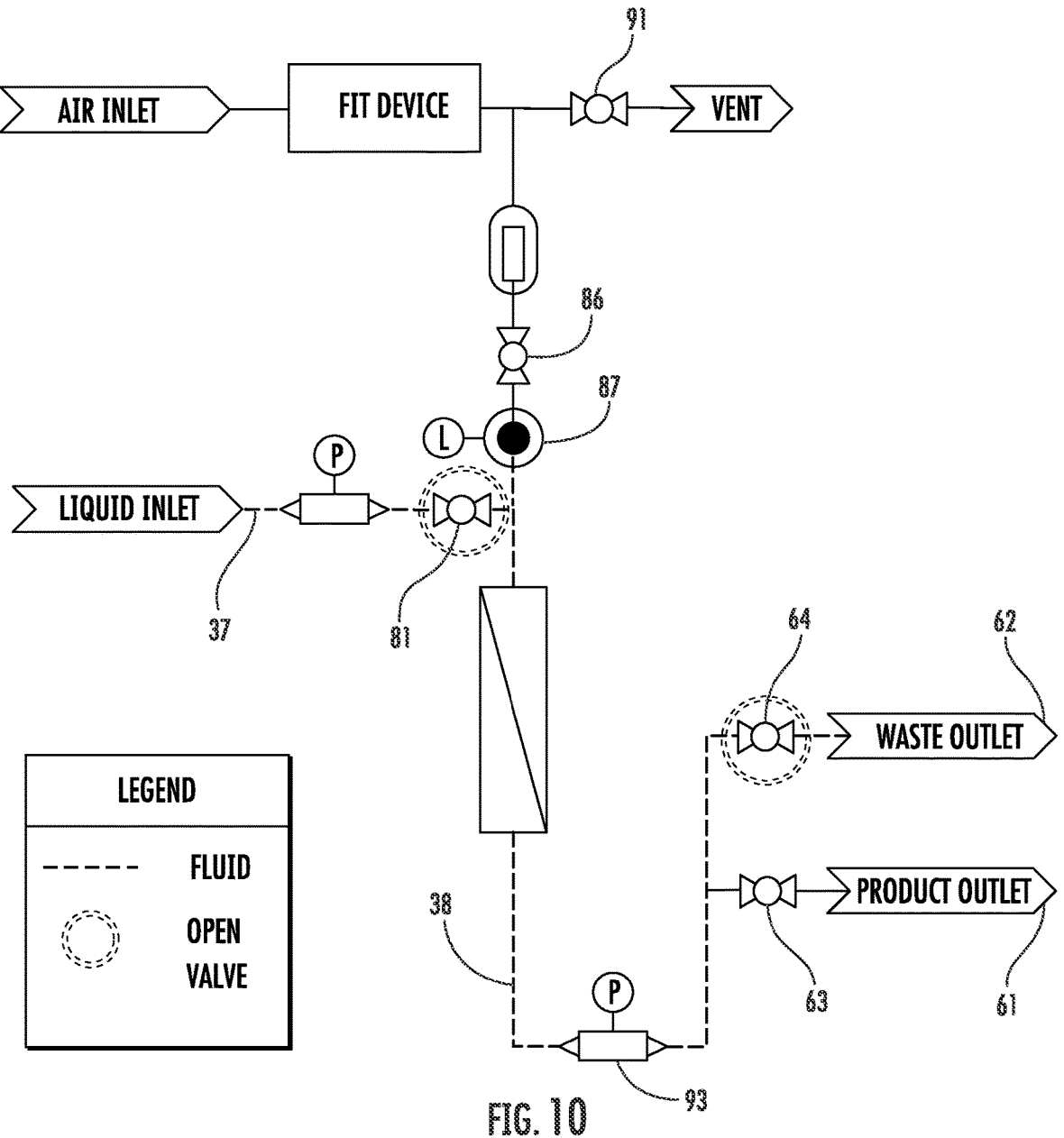
FIG. 10 is a schematic diagram of the fluid filtration system as in FIG. 5, illustrating a downstream filter priming operation.

FIG. 10 is a schematic diagram of the fluid filtration system as in FIG. 5, illustrating a downstream filter priming operation. In response to the liquid sensor 87 detecting the presence of liquid, the control unit 45 has closed the vent valve 91.

In embodiments, the filter priming module is configured to perform a downstream filter priming operation including the following steps when executed by the processor 71: close the vent valves 86, 91, open the fluid supply valve 81 to open the fluid supply conduit 37, close the first outlet valve 63 to occlude the first outlet 61 of the discharge conduit 38, open the second outlet valve 64 to open the second outlet 62 of the discharge conduit 38, operate the pump 34 to deliver the flow of fluid to the upstream end 52 of the single use filter 25, through the single use filter 25, and out of the second outlet 62 of the discharge conduit 38, cease operation of the pump 34 after a predetermined amount of time or in response to the pressure in the discharge conduit 38 reaching a predetermined value based upon the pressure signal for the pressure sensor 93.

Figure 11:
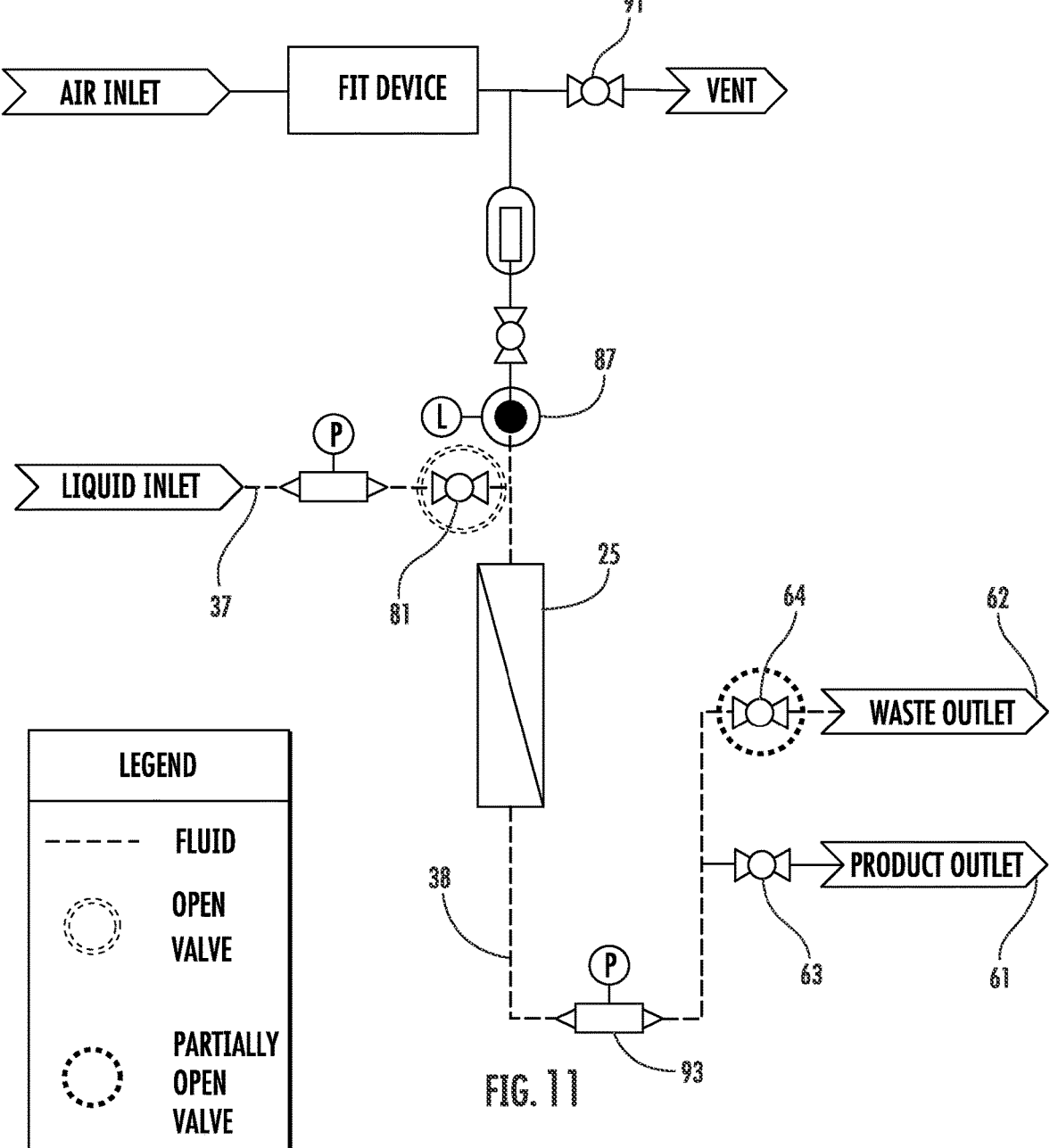
FIG. 11 is a schematic diagram of the fluid filtration system as in FIG. 5, illustrating a filter flushing operation.

FIG. 11 is a schematic diagram of the fluid filtration system as in FIG. 5, illustrating a filter flushing operation. In embodiments, the control unit 45 is programmed with the filter conditioning program which contains a filter flushing module.

In embodiments, the filter flushing module is configured to perform the following steps as part of a flushing operation when executed by the processor 71. The vent valve 91 is closed in response to receiving the liquid detection signal from the liquid sensor 87 The first outlet valve 63 is closed to occlude the first outlet 61 of the discharge conduit 38. The second outlet valve 64 is partially opened to partially open the second outlet 62 of the discharge conduit 38. The fluid supply valve 81 is opened to open the fluid supply conduit 37. The pump 34 is operated to deliver the flow of fluid to the single use filter 25 such that the flow of fluid passes through the single use filter 25 and the discharge conduit 38 and out of the second outlet 62 to thereby produce a backpressure in the discharge conduit 38. The pressure sensor 93 can be used as a feedback loop for the control unit 45 to monitor to produce a defined backpressure in the discharge conduit 38 to improve filter membrane wetting.

In embodiments, the filter flushing module is configured to sequentially open and close the second outlet valve 64 to sequentially open and close the second outlet 62 to thereby produce a pulsing effect in the discharge conduit 38. The pulsing effect can be modulated to help improve filter membrane wetting.

Figure 12:
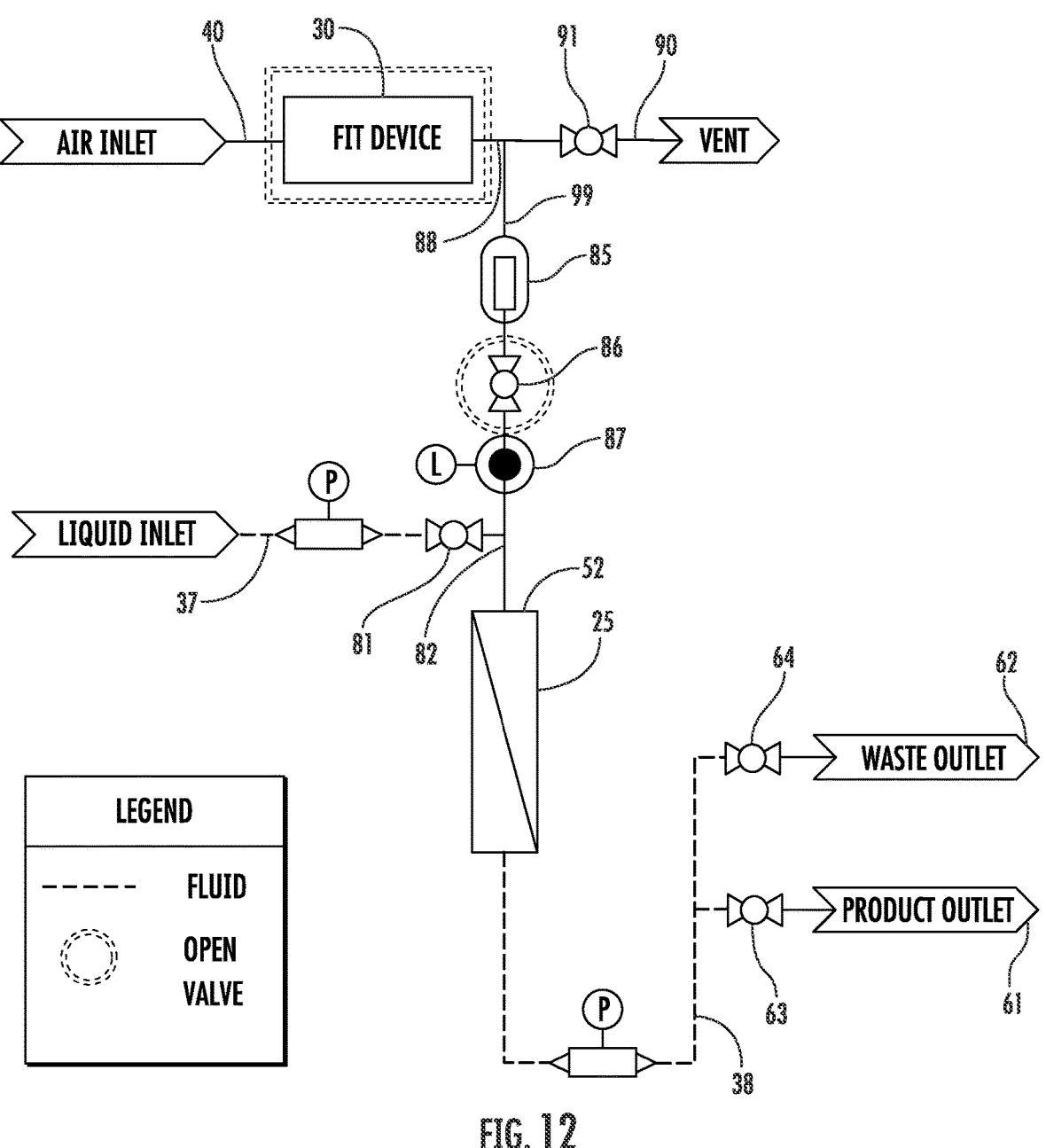
FIG. 12 is a schematic diagram of the fluid filtration system as in FIG. 5, illustrating an upstream filter pressurizing operation for enhanced filter membrane wetting.

FIG. 12 is a schematic diagram of the fluid filtration system as in FIG. 5, illustrating an upstream filter pressurizing operation. In embodiments, the test conduit 40 comprises a pressurized air supply conduit for delivering a supply of pressurized air to the upstream end 52 of the single use filter 25 for pressurizing upstream of the single use filter 25.

The upstream end 52 of the single use filter is in fluid communication with the pressurized air supply conduit 40. The pressurized air supply conduit 40 is adapted to be connected to a source of pressurized air and to selectively direct a flow of pressurized air therethrough to the upstream end 52 of the single use filter 25.

In the illustrated embodiment, the pressurized air supply conduit 40 includes the integrity test device 30 which is adapted to be connected to the source of pressurized air and to selectively direct the flow of pressurized air through the pressurized air supply conduit 40 to the upstream end 52 of the single use filter 25. The processor 71 is in electrical communication with the integrity test device 30 to selectively operate the integrity test device 30. In other embodiments, the integrity test device 30 can be omitted, and the pressurized air supply conduit 40 can be in fluid communication with another means for delivering the pressurized air (e.g., a pressure tank and/or compressor).

The junction 82 of the fluid supply conduit 37 comprises a first junction, and the pressurized air supply conduit 40 includes a second junction (the vent junction 88). The vent conduit 90 is in fluid communication with the second junction 88 such that the upstream end 52 of the single use filter 25 is in fluid communication with the vent conduit 40 via the first junction 82 and the second junction 88 and such that a common branch 99 extends between the second junction 88 and the upstream end 52 of the single use filter 25.

The pressurized air supply conduit 40 includes an air supply valve 86 and an air filter 85. The liquid sensor 87, the air supply valve 86, and the air filter 85 are disposed in the common branch 99. The liquid sensor is disposed between the first junction 82 and the air supply valve 86. The air supply valve 86 is disposed between the liquid sensor 87 and the air filter 85.

In embodiments, the filter conditioning program includes a filter pressurizing module configured to perform the following steps as part of a pressurizing operation when executed by the processor 71. The fluid supply valve 81 is closed to occlude the fluid supply conduit 37. The vent valve 91 is closed to occlude the vent conduit 90. The first and second outlet valves 63, 64 are closed to respectively occlude the first and second outlets 61, 62 of the discharge conduit 38. The flow of pressurized air is directed through the pressurized air supply conduit 40 to the upstream end 52 of the single use filter 25. In embodiments, the filter pressurizing module can be configured, when executed by the processor 71, to sequentially open and close the air supply valve 86 to sequentially open and close the pressurized air supply conduit 40, thereby producing a pulsing effect in the pressurized air supply conduit 40.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid filtration system comprising:

a workstation, the workstation comprising a cabinet;

a pump, the pump supported by the cabinet and adapted to selectively produce a flow of fluid;

a single use filter and a fluid supply conduit, the single use filter having an upstream end and a downstream end, the single use filter removably mounted to the workstation, the upstream end of the single use filter being in fluid communication with the pump via the fluid supply conduit, the fluid supply conduit comprising a test junction;

an integrity test device and a test conduit, the integrity test device supported by the cabinet and in fluid communication with the upstream end of the single use filter via the test conduit, the test conduit fluidly connected to the single use filter via the test junction of the fluid supply conduit, the integrity test device adapted to be connected to a source of pressurized gas and to selectively direct a flow of pressurized gas through the test conduit and the single use filter;

a control unit, the control unit comprising a processor and a non-transitory computer readable medium bearing an integrity test program, the processor arranged with the computer readable medium to execute the integrity test program, the processor being in electrical communication with the integrity test device to selectively operate the integrity test device to perform a test operation on the single use filter using the flow of pressurized gas based upon instructions from the integrity test program.

2. The fluid filtration system according to claim 1, wherein the fluid supply conduit comprises a fluid supply valve, the test conduit comprises a test conduit valve, and the integrity test program is configured to perform the following steps as part of the test operation when executed by the processor:

close the fluid supply valve to occlude the fluid supply conduit, open the test conduit valve to open the test conduit, operate the integrity test device to direct the flow of pressurized gas through the test conduit and through the single use filter.

3. The fluid filtration system according to claim 1, wherein the test conduit comprises an air filter disposed between the integrity test device and the single use filter.

4. The fluid filtration system according to claim 1, wherein the test conduit comprises a liquid sensor disposed between the integrity test device and the test junction.

5. The fluid filtration system according to claim 1, wherein the test conduit comprises an air filter disposed between the integrity test device and the single use filter, a liquid sensor disposed between the air filter and the test junction, and a test conduit valve disposed between the air filter and the liquid sensor.

6. The fluid filtration system according to claim 1, wherein the test conduit comprises a vent junction, the system further comprising:

a vent conduit, the vent conduit in fluid communication with the test conduit via the vent junction, the vent conduit comprising a vent valve;

wherein the integrity test program is configured to perform the following step as part of the test operation when executed by the processor:

close the vent valve to occlude the vent conduit.

7. The fluid filtration system according to claim 1, further comprising:

a discharge conduit, the discharge conduit in fluid communication with the downstream end of the single use filter, the discharge conduit comprising a first outlet and a second outlet and a first outlet valve and a second outlet valve respectively associated with the first outlet and the second outlet, the first outlet adapted for fluid connection to a product container and the second outlet adapted for fluid connection to a waste repository;

wherein the integrity test program is configured to perform the following steps as part of the test operation when executed by the processor:

close the first outlet valve to occlude the first outlet, open the second outlet valve to open the second outlet.

8. The fluid filtration system according to claim 7, wherein the discharge conduit comprises a pressure sensor configured to measure a pressure within the discharge conduit, the pressure sensor configured to generate a pressure signal indicative of the pressure measured within the discharge conduit, the processor in electrical communication with the pressure sensor to receive the pressure signal therefrom.

9. The fluid filtration system according to claim 8, wherein the integrity test device includes a FIT pressure sensor, the FIT pressure sensor configured to generate a pressure signal indicative of the pressure measured within the test conduit upstream of the single use filter, the processor in electrical communication with the FIT pressure sensor to receive the pressure signal therefrom, and wherein the integrity test program is configured to perform the following steps as part of the test operation when executed by the processor:

receive the pressure signal from the FIT pressure sensor, determine whether a test condition of the test operation is satisfied based upon the pressure signal.

10. The fluid filtration system according to claim 1, further comprising:

a display device, the display device in operable arrangement with the processor;

wherein the integrity test program is configured to perform the following steps as part of the test operation when executed by the processor:

determine whether the single use filter satisfied the test operation, generate a graphical display containing a graphical indication of whether the single use filter satisfied the test operation, display the graphical display on the display device.

* * * * *